US006876292B2

(12) United States Patent
Onuma et al.

(10) Patent No.: US 6,876,292 B2
(45) Date of Patent: Apr. 5, 2005

(54) ELECTRONIC KEY SYSTEM FOR VEHICLE

(75) Inventors: Yoshiki Onuma, Kanagawa (JP); Teppei Nagano, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 366 days.

(21) Appl. No.: 09/819,647

(22) Filed: Mar. 29, 2001

(65) Prior Publication Data

US 2001/0026213 A1 Oct. 4, 2001

(30) Foreign Application Priority Data

Apr. 3, 2000 (JP) ........................................ 2000-100972

(51) Int. Cl.[7] .......................... G05B 23/00; G06F 7/04; H04B 1/00; B60R 25/00; G08B 29/00
(52) U.S. Cl. ........................ 340/5.62; 340/5.72; 340/5.7
(58) Field of Search ................................. 340/5.72, 5.6, 340/5.61, 5.62, 5.64, 5.65, 5.66, 5.27, 5.2, 5.21, 5.22, 5.24, 825.69, 825.72; 307/10.5

(56) References Cited

U.S. PATENT DOCUMENTS

| | | | | |
|---|---|---|---|---|
| 4,347,545 A | * | 8/1982 | Weishaupt et al. | .......... 361/172 |
| 5,422,634 A | * | 6/1995 | Okubo | ...................... 340/5.24 |
| 5,708,308 A | * | 1/1998 | Katayama et al. | .......... 307/10.5 |
| 5,844,495 A | * | 12/1998 | Griessbach | ................ 340/5.26 |
| 5,897,598 A | | 4/1999 | Puetz | |
| 6,031,466 A | * | 2/2000 | Leshets et al. | ............. 340/7.35 |
| 6,414,586 B1 | | 7/2002 | Yoshizawa | |
| 6,567,012 B1 | * | 5/2003 | Matsubara et al. | .... 340/825.72 |

FOREIGN PATENT DOCUMENTS

| | | |
|---|---|---|
| DE | 198 39 478 A1 | 3/2000 |
| EP | 0 637 529 A | 8/1994 |
| EP | 0 817 734 B1 | 4/1996 |
| JP | 8246728 | 9/1996 |
| JP | 11-38875 | 2/1999 |
| JP | 11-036675 | 2/1999 |

* cited by examiner

*Primary Examiner*—Michael Horabik
*Assistant Examiner*—Nam V Nguyen
(74) *Attorney, Agent, or Firm*—McDermott Will & Emery LLP

(57) ABSTRACT

An on-vehicle apparatus communicates with an electronic key by wireless communication. The one-vehicle apparatus decides to unlock a vehicular door according to an identification result between first ID of the electronic key and unlock-operation ID of the on-vehicle apparatus, and decides to start an engine of the vehicle according to an identification result between second ID of the electronic key and engine-starting ID of the on-vehicle apparatus. The on-vehicle apparatus commands the electronic key to output third ID shorter in data length than the second ID, when the first ID corresponds with the unlock-operation ID. The on-vehicle apparatus permits starting the engine when the third ID corresponds with compacted data of the engine-starting ID.

15 Claims, 9 Drawing Sheets

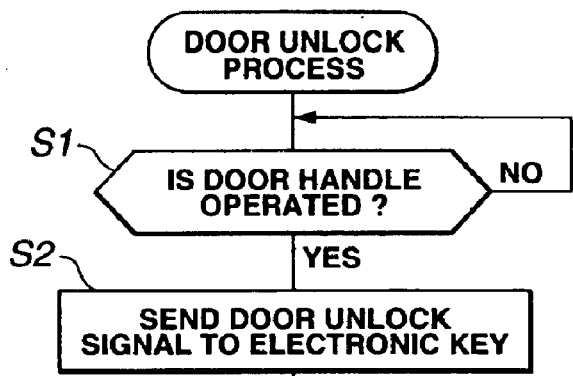
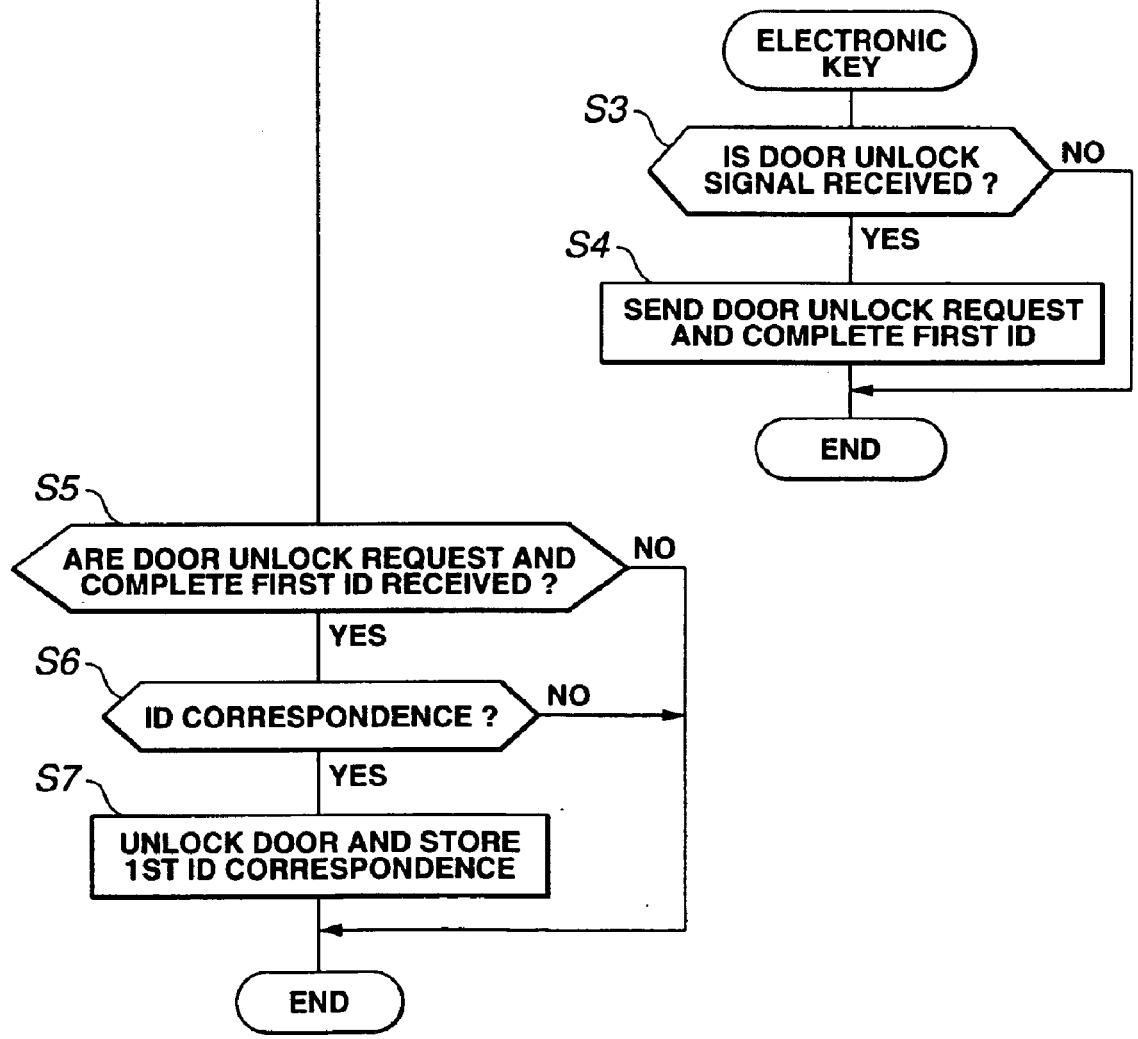

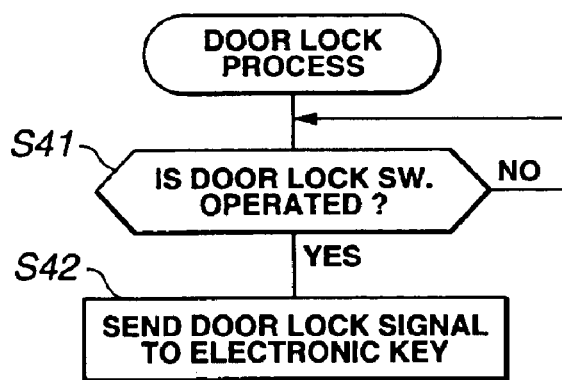
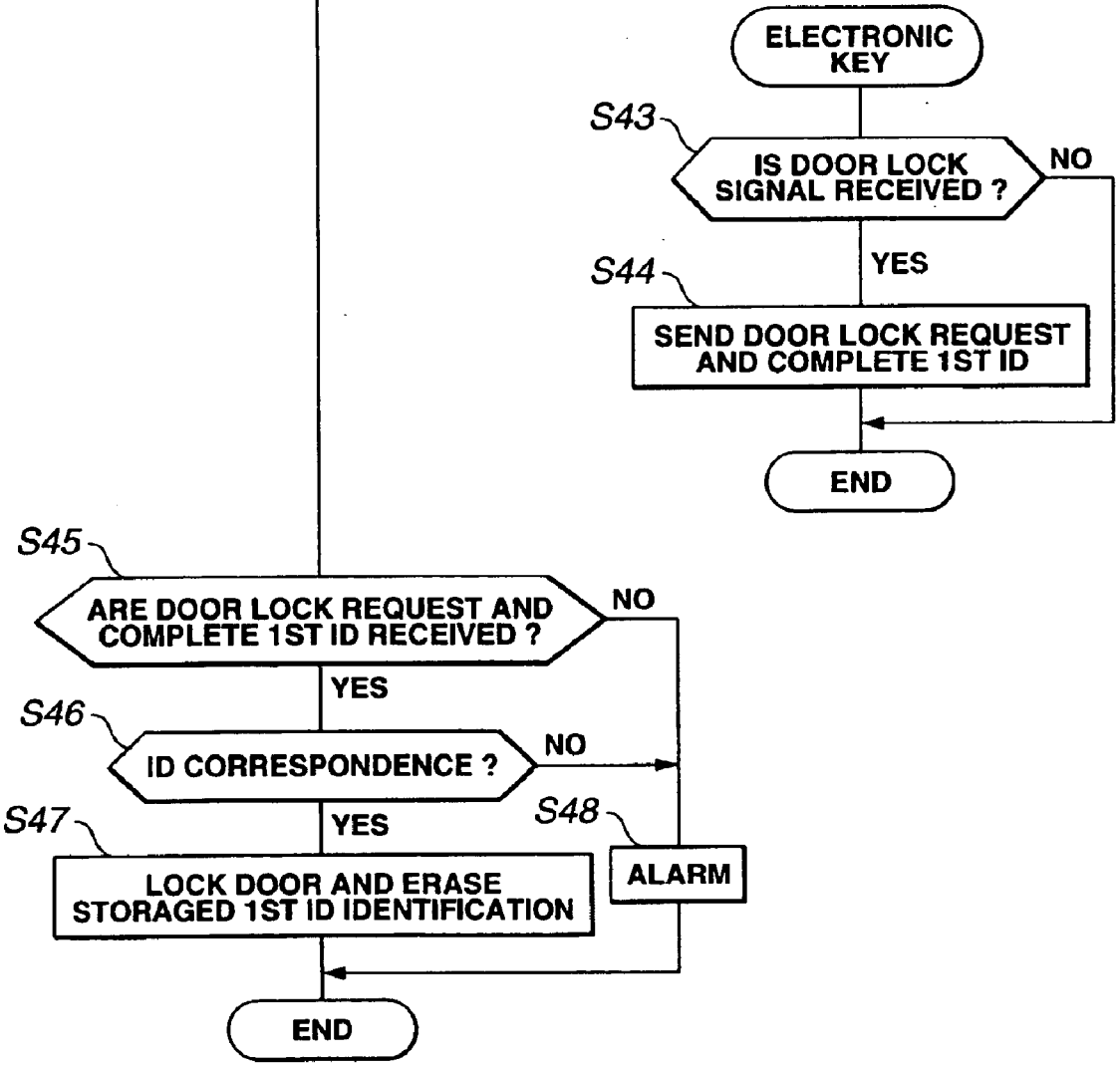

ELECTRONIC KEY SYSTEM FOR VEHICLE

BACKGROUND OF THE INVENTION

The present invention relates to a vehicular electronic key system for unlocking/locking doors and starting an engine. The electronic key system includes an electronic key and an on-vehicle apparatus which communicate with each by means of wireless communication and identify ID (identification data) therebetween to permit the door unlocking/locking operation and the engine starting operation.

A Japanese Patent Provisional Publication No. (Heisei) 11-36675 discloses a vehicular electronic key system which executes unlocking door according to an identification result between a first ID code of an electronic key and a registered ID code and executes starting an engine according to an identification result between a second ID code sent of the electronic key and another registered ID code.

SUMMARY OF THE INVENTION

However, the above vehicular electronic key system employs different ID codes for the door unlock and the engine start, respectively, and executes checking processes by respectively receiving the different ID codes by means of wireless communication. Therefore, this system has a characteristic that a time necessary for starting an engine becomes relatively long though a security to burglar is improved.

It is therefore an object of the present invention to provide an improved vehicular electronic key system which shortens an ID identification time necessary for starting an engine while ensuring a security to vehicle burglar.

An electronic key system according to the present invention is for a vehicle and comprises an electronic key and an on-vehicle apparatus. The electronic key has first ID (identification data), second ID, and third ID, which is shorter in data length than the second ID. The electronic key outputs the first ID, the second ID, and the third ID. The on-vehicle apparatus communicates with the electronic key by means of wireless communication. The on-vehicle apparatus has fourth ID, fifth ID, and sixth ID which is shorter in data length than the fifth ID. The on-vehicle apparatus permits starting an engine of the vehicle when the second ID outputted from the electronic key corresponds with the fifth ID. The on-vehicle apparatus permits starting the engine when the first ID outputted from the electronic key corresponds with the fourth ID and when the third ID outputted from the electronic key corresponds with the sixth ID.

BRIEF DESCRIPTION OF THE DRAWINGS

FIG. 7A is a flowchart showing a door unlock process executed by the on-vehicle apparatus, and FIG. 7B is a flowchart showing a door unlock process executed by the electronic key in connection with the on-vehicle apparatus.

FIG. 11A is a flowchart showing a part of a door lock process executed by the on-vehicle apparatus, and FIG. 11B is a flowchart showing a part of the door lock process executed by the electronic key in connection with the on-vehicle apparatus.

DETAILED DESCRIPTION OF THE INVENTION

Referring to FIGS. 1 to 11, there is shown an embodiment of a vehicular electronic key system according to the present invention.

Figure 1:
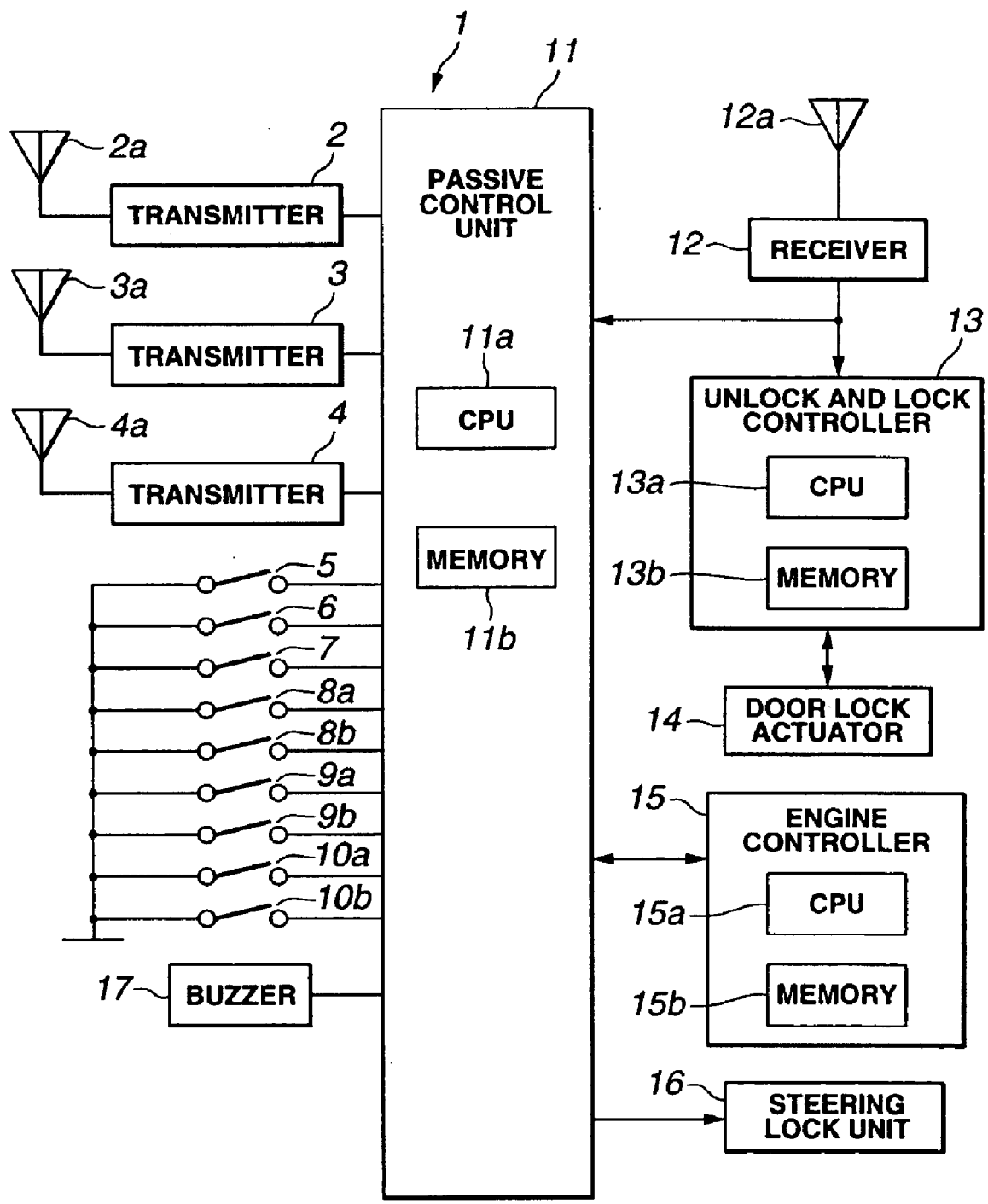
FIG. 1 is a schematic view showing an on-vehicle apparatus of an electronic key system according to an embodiment of the present invention.
Figure 2:
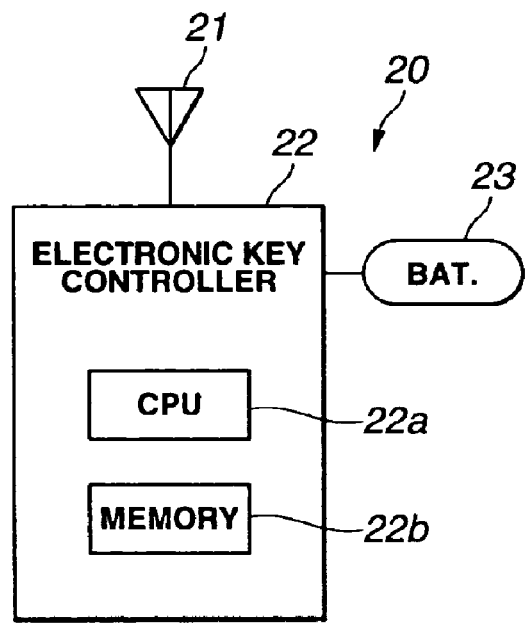
FIG. 2 is a schematic view showing an electronic key of the electronic key system.
Figure 3:
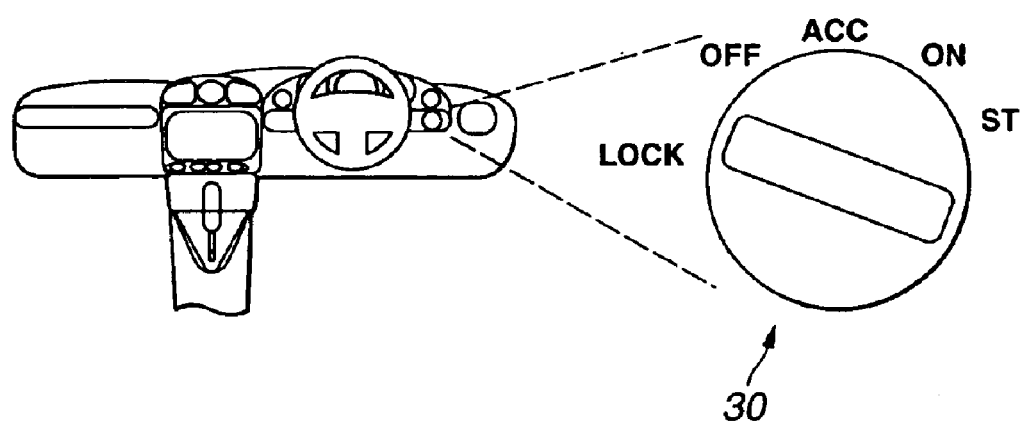
FIG. 3 is a view showing an ignition knob and an installed portion thereof in an instrument panel of a vehicle according to the embodiment of the present invention.

The vehicular electronic key system comprises an on-vehicle apparatus 1 shown in FIG. 1, an electronic key 20 shown in FIG. 2 and an ignition switch operated by an ignition knob 30 shown in FIG. 3.

As shown in FIG. 1, on-vehicle apparatus 1 of the vehicular electronic key system comprises passive control unit 11, first, second and third transmitters 2, 3 and 4, a receiver 12, an unlock and lock controller 13, an engine controller 15, a steering lock unit 16 and a buzzer 17. Unlock and lock controller 13 is connected to a door lock actuator 14 through which vehicular doors are opened and closed. Further, on-vehicle apparatus 1 is connected to various switches as explained later.

As shown in FIG. 2, electronic key 20 comprises an antenna 21, an electronic key controller 22 and a battery 23. Electronic key controller 22 comprises a CPU 22a and a nonvolatile memory 22b of a peripheral equipment. Electronic key controller 22 executes wireless communication with on-vehicle apparatus 1 through antenna 21. Nonvolatile memory 22b stores ID (Identification Data) codes for identifying a person having electronic key 20 as a permitted driver. Battery 23 is exchangeable and supplies electric power to electronic key controller 22.

Electronic key 20 has no key plate employed in a conventional ignition key and is formed into a card which is further portable for a driver as compared with a conventional key. No cylinder unit for receiving electronic key 20 is provided in on-vehicle apparatus 1. It is not necessary for the driver to set electronic key 3 at a predetermined position, and the driver may merely carry electronic key 20. Ignition knob 30 is installed on an instrument panel in a passenger compartment of the vehicle as shown in FIG. 3, and no key hole is provided thereto since it is not necessary to insert electronic key 20 to the ignition switch unit.

The ignition switch unit (not-shown) operated by ignition knob 30 is connected to passive control unit 11 and comprises a key switch 5, ignition-on switch 6, an engine start switch 7, and a steering lock unit 16 for locking a steering wheel. Ignition knob 30 is manually operated by the driver carrying electronic key 30. Steering lock unit 16 comprises a turn inhibiting latch (not shown) for inhibiting the turning of ignition knob 30 by locking ignition knob 30. Accordingly, by putting this turn inhibiting latch in a turnable state, ignition knob 30 and the steering wheel are put in the turnable state.

By pushing ignition knob 30 set at a steering lock position denoted by LOCK in FIG. 3, key switch 5 is switched on. Further, by turning ignition knob 30 to an ignition-on position denoted by ON in FIG. 3, ignition-on switch 6 is switched on. By further turning ignition knob 30 to an engine start position denoted by START in FIG. 3, engine start switch 7 is switched on.

Figure 4:
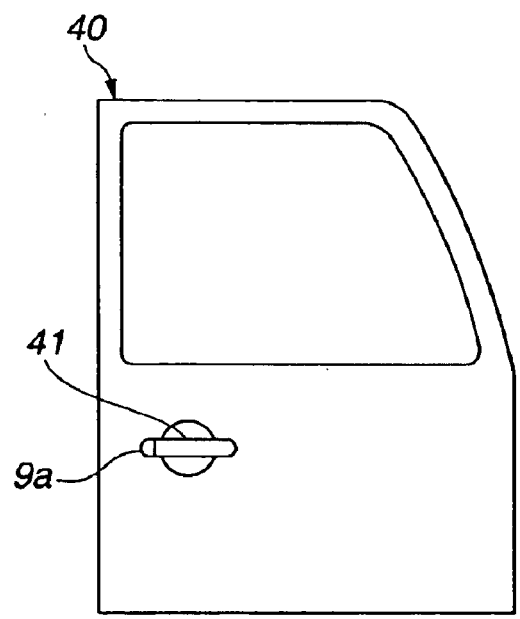
FIG. 4 is a view showing a driver door according to the embodiment of the present invention.

Door handle switches 8a and 8b are provided in order to start a door unlock process as to doors for front vehicle occupants. Door lock switches 9a and 9b are provided in order to start a door lock process as to the doors for front seats. As shown in FIG. 4, door lock switch 9a is installed at a portion near a door outside handle 41 for a driver door 40 and is operated from the outside of the vehicle when driver door 40 is locked. As is similar to door lock switch 9a, door lock switch 9b is installed at a portion near a door outside handle 41 for an assistant (front passenger) door. Door lock condition switches 10a and 10b are switches for detecting whether driver door 40 and assistant door 43 are locked or unlocked, respectively. Each of door lock condition switches 10a and 10b is switched off when a door lock mechanism (not shown) for each of front doors 40 and 43 is put in a lock condition, and is switched on when the door lock mechanism is put in an unlock condition.

On-vehicle apparatus 1 executes wireless communication with electronic key 20 through first, second and third transmitters 2, 3 and 4 and a receiver 12, First transmitter 2 is installed at the driver seat or a ceiling above the driver seat. First transmitter 2 sends an engine start signal to electronic key 20 through an antenna 2a. By controlling the directivity of antenna 2a, communicable range between on-vehicle apparatus 1 and electronic key 20 is limited within a range of a passenger compartment near the driver seat. The communicable range may be limited in a range where first transmitter 2 can send the signal to electronic key 20 carried by a driver seated on the driver seat.

Figure 5:
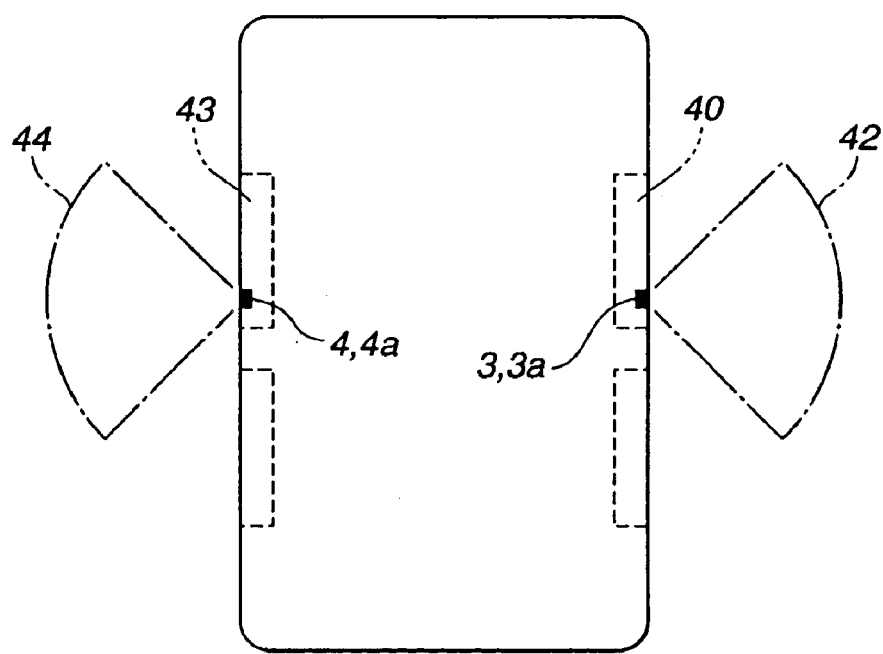
FIG. 5 is a top view showing communicable areas of door antennas installed near doors according to the embodiment of the present invention.

As shown in FIG. 5, second transmitter 3 is installed in the vicinity of door outside handle 41 of driver door 40 and sends a door lock signal and a door unlock signal through a driver door antenna 3a to electronic key 20 carried by the driver who is found near driver door 40. By controlling the directivity of driver-door antenna 3a, communicable range between on-vehicle apparatus 1 and electronic key 20 is limited within a range 42 of an outside near driver door 40 as shown in FIG. 5. The communicable table range 42 may be limited in a range where second transmitter 3 can send the signal to electronic key 20 carried by a driver who will execute a door lock by operating door lock switch 9a.

Similarly, third transmitter 4 is installed in the vicinity of door outside handle 41 of assistant door 43 and sends a door lock signal and a door unlock signal through an assistant-door antenna 4a to electronic key 20 carried by the driver who is found near assistant door 43. By controlling the directivity of assistant-door antenna 4a, communicable range between on-vehicle apparatus 1 and electronic key 20 is limited within a range 44 of an outside near assistant door 43. The communicable range 44 may be limited in a range where third transmitter 4 can send the signal to electronic key 20 carried by a vehicle occupant who will execute a door lock by operating door lock switch 9b.

Receiver 12 is installed at a rear parcel located at a vehicle rear portion, and receives an engine start request signal, a lock request signal, an unlock request signal and ID codes from electronic key 20 through an antenna 12a. Unlock and lock controller 13 comprises a CPU 13a and a nonvolatile memory 13b and executes locking and unlocking operations of driver door 40, assistant door 43, the rear-passenger doors by controlling door lock actuator 14. Engine controller 15 comprises a CPU 15a and a nonvolatile memory 15b and controls an engine speed and an output torque of an engine by controlling a throttle valve control apparatus, a fuel injection apparatus and an ignition apparatus.

Passive control unit 11 comprises a CPU 11a and a nonvolatile memory 11b, and communicates with electronic key 20 via transmitters 2, 3 and 4 and receiver 12 by means of wireless communication. Passive control unit 11 executes the door unlocking and locking operations and the engine starting and stopping operations in a manner of controlling unlock and Lock controller 13 and engine controller 15 according to the set conditions of ignition switches 5 to 7, door handle switches 8a and 8b, door lock switches 9a and 9b, and lock condition switches 10a and 10b.

A buzzer 17 is provided in order to warn that electronic key 20 is mislaid in the vehicle, and is installed at a position from which a vehicle occupant outside of the vehicle can hear the alarm of buzzer 17. It is certain that a speaker may be provided instead of buzzer 7 and may inform the alarm condition to the vehicle occupant by voice.

In this embodiment, a first ID code is employed for locking and unlocking driver door 40, assistant door and the rear-passenger doors, and a second ID code different from the first ID code is employed for starting the engine of the vehicle through engine controller 15. The first and second ID codes are stored in memory 22b of electronic key 20 and are previously registered in memory 11b of passive control unit 11.

When the door unlock operation is executed, passive control unit 11 of on-vehicle apparatus 1 checks whether the first ID code sent from electronic key 20 corresponds with the registered ID code in passive control unit 11. When the first ID code from electronic key 20 corresponds with the registered ID code for locking and unlocking process, passive control unit 11 outputs a door unlock allowing signal to unlock and lock controller 13 to allow the door unlock operation and stores an ID correspondence result indicative of correspondence between ID code of electronic key 20 and ID code of passive control unit 11 in memory 11b.

Next, when the engine is started, passive control unit 11 checks whether the second ID code sent from electronic key 2 corresponds with the registered ID code in passive control unit 11. According to the identification result of the first ID code, passive control unit 11 executes different identifying method. When the passive control unit 11 has stored the correspondence result of the first ID code, the passive control unit 11 requests electronic key 20 to send a first part of the second ID code. In reply to the request of the passive control unit 11, electronic key 20 sends only a first part of the second ID code to passive control unit 11. Passive control unit 11 checks whether the first part of the second ID code sent from electronic key 20 corresponds with a first part of the registered second ID code registered in the passive control unit 11. When the first part of the second ID code corresponds with the first part of the registered second ID code for engine start process, the engine starting is permitted.

On the other hand, in a case that the doors 40 and 43 are unlocked by means of a spare key or the like, the ID identifying operation is not executed. Therefore, in this case, passive control unit 11 does not store the first ID code correspondence result. When the first ID code correspondence result is not stored, passive control unit 11 requests electronic key 20 to send all of the second ID code. Then, passive control unit 11 checks whether the complete second ID code sent from electronic key 20 corresponds with the registered complete second ID code registered in memory 11b. When the second ID code received corresponds with the registered second ID code, the engine starting is permitted.

In this description, the first part of the ID code is called as a compacted ID code, and all of the ID code is called as a complete ID code.

When the decision as to whether the engine is started is made on the basis of the identification result of the second ID code after the decision as to whether the door unlock operation is executed has been made on the basis of the identification of the first ID code, if the correspondence result of the first ID code has been already obtained, it is highly probable that a driver actually executing the engine starting operation is a proper driver to be permitted to drive the vehicle. Therefore, in this case, the decision as to the engine starting is made by identifying the compacted second ID without employing the complete second ID. This arrangement is capable of shortening an ID identifying process time necessary for the engine start while ensuring the security to burglar prevention.

Figure 6A:
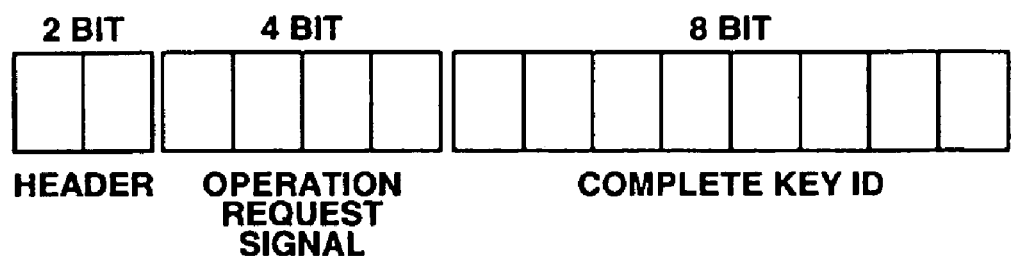
FIGS. 6A and 6B are views showing code structures of ID codes employed in the embodiment.
Figure 6B:
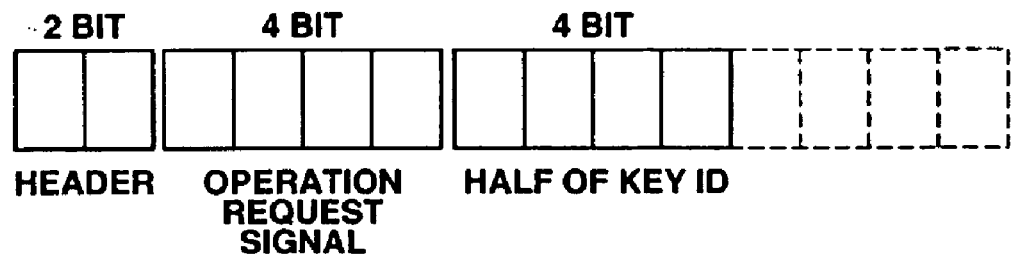

FIGS. 6A and 6B show structures of the complete ID code and the compacted ID code which are employed in the embodiment according to the present invention. The complete ID code is constituted by a header of 2 bits, an operation request signal of 4 bits and a key ID of 8 bits. The operation request signal includes the door lock request signal, the door unlock request signal and the engine start request signal. On the other hand, the compacted ID code employs a first part of the key ID in the complete ID code, and therefore the data length of the compacted ID code is shorter than that of the complete ID code by 4 bits. The header and the operation request signal of the compacted ID code are the same as those of the complete ID code. By constructing the compacted ID code from a part of the complete ID code, it becomes possible to further shorten the ID identifying time without increasing the kinds of registered ID code.

It will be understood that the structure of the ID code, the data length and the compacting method of the compacted ID code are not limited to this embodiment. Further, the compacted ID code may not employ a part of the key ID of the complete ID code and may employ a different key ID completely different from the key ID of the complete ID code. It is certain that the data length of the compacted ID code is set to be shorter than that of the complete ID code.

Next, the manner of operation of the embodiment according to the present invention will be discussed with reference to FIGS. 7A to 11. First, the door unlock process will be discussed with reference to FIGS. 7A and 7B. Herein, although the door unlock process of driver door 40 is discussed, the door unlock process of assistant door 43 is the same as the process of the driver door 40. Therefore, the explanation of the door unlock process of assistant door 43 is omitted herein. The operations shown by a flowchart of FIG. 7A is executed by on-vehicle apparatus 1, and is linked with the operations executed by electronic key 20.

At step S1, on-vehicle apparatus 1 decides whether door handle switch 8a is turned on according to the driver's operation for pulling door outside handle 41 of driver door 40. When door handle switch 8a is switched on, the routine proceeds to step S2. When door handle switch 8a is not switched on, the routine repeats the step S1 until the affirmative decision is made at step S1.

At step S2, on-vehicle apparatus 1 sends the door unlock signal to electronic key 20 through transmitter 3 and antenna 3a installed to driver door 40.

As shown in FIG. 7B, electronic key 20 starts awaiting the door unlock signal outputted from on-vehicle apparatus 1 in reply to the start of this door unlock process. In reply to the door unlock signal from on-vehicle apparatus 1, electronic key 20 executes an operation of step S3 that receives the door unlock signal from the on-vehicle apparatus 1.

At step S3, electronic key 20 decides whether the door unlock signal is received. When electronic key 20 does not receive the door unlock signal from on-vehicle apparatus 1 for the predetermined time period, the routine of FIG. 7B jumps to an end step to terminate the operation of the door unlock process. When electronic key 20 receives the door unlock signal from on-vehicle apparatus 1, the routine proceeds to step S4 wherein electronic key 20 outputs the door unlock request and the complete first ID code to on-vehicle apparatus 1. Thereafter, the routine executed by electronic key 20 is terminated.

At step S5, on-vehicle apparatus 1 checks for a predetermined time period whether receiver 12 has received the door unlock request and the complete first ID code from electronic key 20 through antenna 12a. When the door unlock request and the complete first ID code are received, the routine proceeds to step S6. When receiver 12 does not receive the door unlock request and the complete first ID code within the predetermined time period, the routine proceeds to an end step to terminate the present routine.

At step S6, on-vehicle apparatus 1 checks whether the complete first ID code sent from electronic key 20 corresponds with the registered complete ID code (corresponding to the first ID code) for door unlock process. When the complete first ID code sent from electronic key 20 corresponds with the registered complete ID code for door unlock process, the routine proceeds to step S7. When the complete first ID code does not corresponds with the registered complete ID code for door unlock process, the routine proceeds to the end step.

At step S7, on-vehicle apparatus 1 unlocks both doors 40 and 43 by controlling unlock and lock controller 13, and stores the correspondence result of the first ID code in memory 11b of passive control unit 11. When step S7 is not executed, that is, when the negative decision is made at step S5 or S6, the routine is terminated without unlocking doors 40 and 43.

Next, the engine start process will be discussed with reference to FIGS. 8A to 10.

At step S11, on-vehicle apparatus 1 decides whether ignition knob 30 is operated by a driver. When the decision at step S11 is affirmative, that is, when ignition knob 30 is pushed by the driver, key switch 5 is switched on, and the engine start process is started. When the decision at step S11 is negative, on-vehicle apparatus 1 repeats step S11 for a predetermined time period.

At step S12, on-vehicle apparatus 1 checks whether the correspondence of the first ID code has been stored in memory 11b. When the correspondence of the first ID code has been stored in memory 11b, the routine proceeds to step S13. When the correspondence of the first ID code has not been stored in memory 11b, the routine jumps to step S21 of FIG. 9A.

At step S13, on-vehicle apparatus 1 outputs the engine start signal and the compacted ID code requesting signal to electronic key 20 through first transmitter 2 and antenna 2a.

Figure 8A:
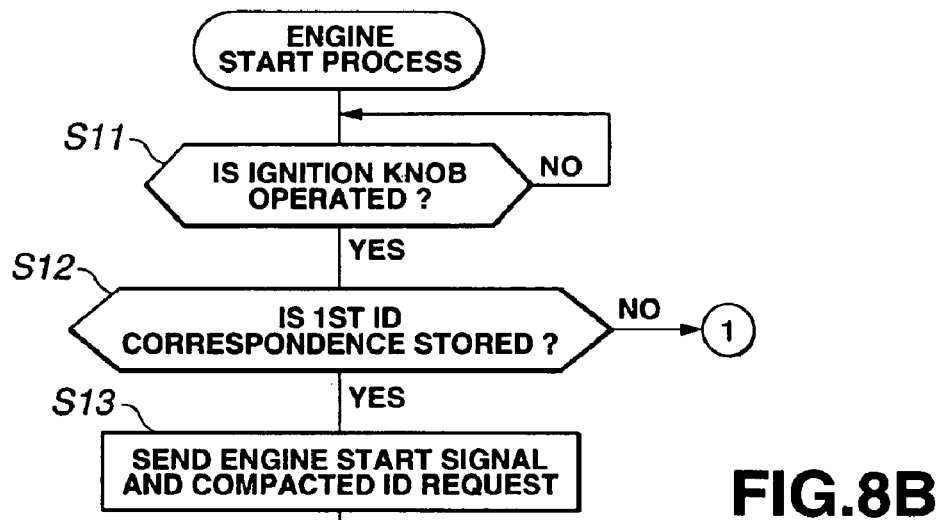
FIG. 8A is a flowchart showing a part of an engine start process executed by the on-vehicle apparatus.
Figure 8B:
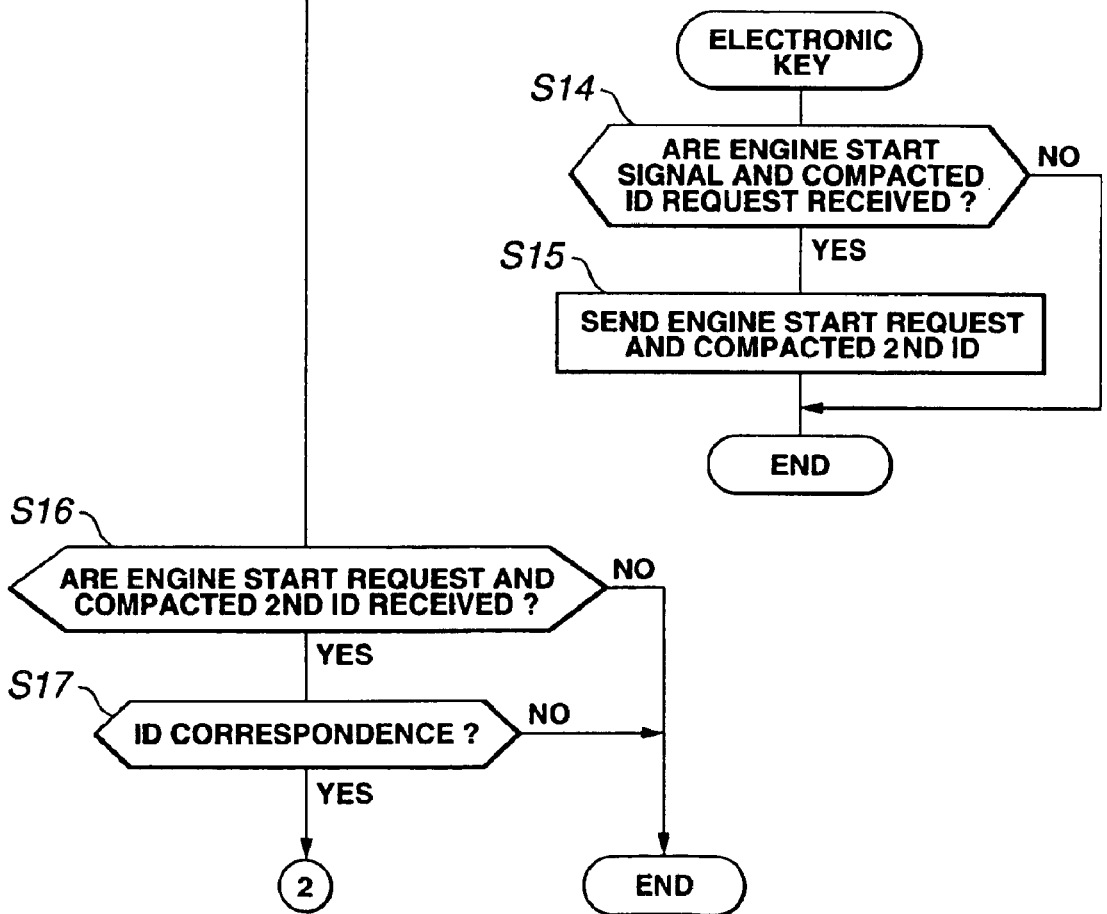
FIG. 8B is a flowchart showing a part of the engine start process executed by the electronic key in connection with the on-vehicle apparatus.

As shown in FIG. 8B, electronic key 20 starts awaiting the engine start signal and the compacted ID request signal in reply to the start of the engine start process of FIG. 8A.

At step S14, electronic key 20 decides whether the engine start signal and the compacted ID request signal are received. When electronic key 20 does not receive the engine start signal and the compacted ID request signal from on-vehicle apparatus 1 for a predetermined time period, the routine of FIG. 8B jumps to an end step to terminate the operation of the electronic key 20. When electronic key 20 receives the engine start signal and the compacted ID request signal from on-vehicle apparatus 1, the routine proceeds to step S15 wherein electronic key 20 outputs the engine start request signal and the compacted second ID signal to on-vehicle apparatus 1. Thereafter, the routine executed by electronic key 20 is terminated.

At step S16, on-vehicle apparatus 1 checks for a predetermined time period whether on-vehicle apparatus 1 has received the engine start request signal and the compacted second ID through antenna 12a and receiver 12. When the decision at step S16 is negative, the routine jumps to an end block to terminate the routine of FIG. 8A. When the decision at step S16 is affirmative, the routine proceeds to step S17.

At step S17, on-vehicle apparatus 1 checks whether the compacted second ID sent from electronic key 20 corresponds with a part corresponding to the compacted section of the registered complete second ID code registered in memory 11b. When the compacted second ID code received corresponds with the registered compacted second ID code of passive control unit 11, the routine proceeds to step S31 of FIG. 10. When the received compacted second ID code does not correspond with the registered compacted second ID code, the routine proceeds to the end step to terminate the engine start process.

That is, when on-vehicle apparatus 1 does not receive the engine start request signal and the compacted second ID code signal from electronic key 20, or when the received compacted second ID code does not correspond with the registered compacted second ID code, on-vehicle apparatus 1 inhibits the engine start and terminates the engine start process. On the other hand, when on-vehicle apparatus 1 receives the engine start request signal and the compacted second ID code signal from electronic key 20 and when the received compacted second ID code corresponds with the registered compacted second ID code, the routine of on-vehicle apparatus 1 proceeds to step S31 shown in FIG. 10.

At step S31 following to the affirmative decision of step S17, on-vehicle apparatus 1 turns a knob turn inhibiting latch toward the unlock position by controlling steering lock unit 16. By turning the knob turn inhibiting latch to the unlock position, ignition knob 30 and the steering wheel are put in the turnable states, respectively.

At step S32, on-vehicle apparatus 1 decides from a condition of ignition-on switch 6 whether ignition knob 30 is turned to ON position. When ignition knob 30 is turned to ON position, that is, when ignition-on switch 6 is switched on, the routine proceeds to step S33 wherein passive control unit 11 of on-vehicle apparatus 1 outputs an engine start permitting signal to engine controller 15. When ignition knob 30 is not turned to ON position, the routine repeats step S32 until ignition knob 30 is turned to ON position.

At step S34, on-vehicle apparatus 1 checks from a condition of engine start switch 7 whether ignition knob 30 is turned to START position. When ignition knob 30 is turned to START position, that is, when engine start switch 7 is switched on, the routine proceeds to step S35 wherein on-vehicle apparatus 1 starts the engine in a manner that passive controller 11 commands engine controller 15 to start the engine. When ignition knob 30 is not turned to START position, the routine repeats step S34.

At step S36, on-vehicle apparatus 1 checks from the condition of ignition-on switch 6 whether ignition knob 30 is turned to ACC position. When ignition knob 30 is turned to ACC position, that is, when ignition-on switch 6 is switched off, the routine proceeds to step S37 wherein on-vehicle apparatus 1 stops the engine by controlling engine controller 15. When ignition-on switch 6 is not switched off, the routine repeats step S36.

At step S38, on-vehicle apparatus 1 checks from a condition of key switch 5 whether ignition knob 30 is turned to LOCK position. When ignition knob 30 is turned to the LOCK position, that is, when key switch 5 is switched off, the routine proceeds to step S39 wherein on-vehicle apparatus 1 moves knob turn inhibiting latch to the lock position by controlling steering lock unit 16. This operation puts ignition knob 30 and the steering wheel in the locked state. After the execution of step S39, the routine proceeds to an end step to terminate the present routine.

Figure 9A:
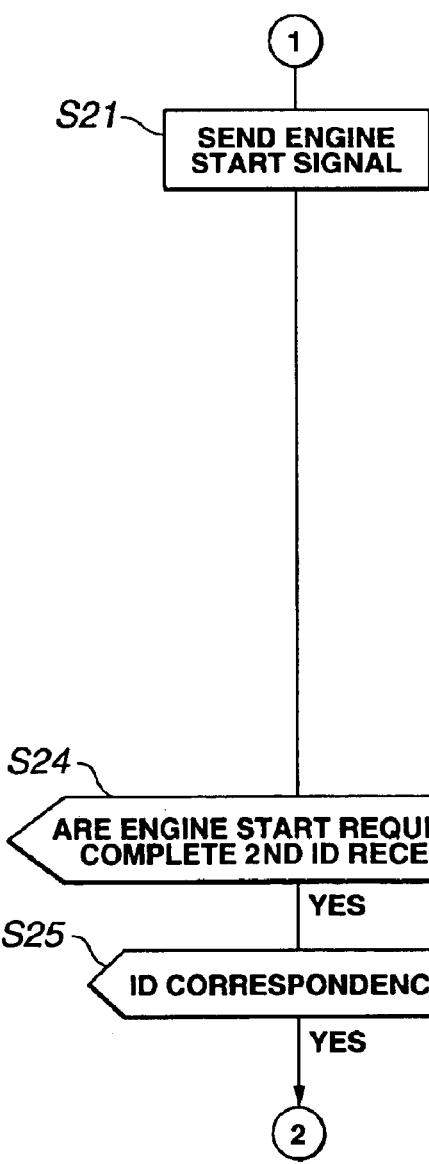
FIG. 9A is a flowchart showing another part of the engine start process executed by the on-vehicle apparatus.

Further, when the decision at step S12 in FIG. 8A is negative, that is, when the correspondence of the first ID code has not been stored in memory 11b, the routine jumps to step S21 of FIG. 9A. At step S21, on-vehicle apparatus 1 sends the engine start signal to electronic key 20.

Figure 9B:
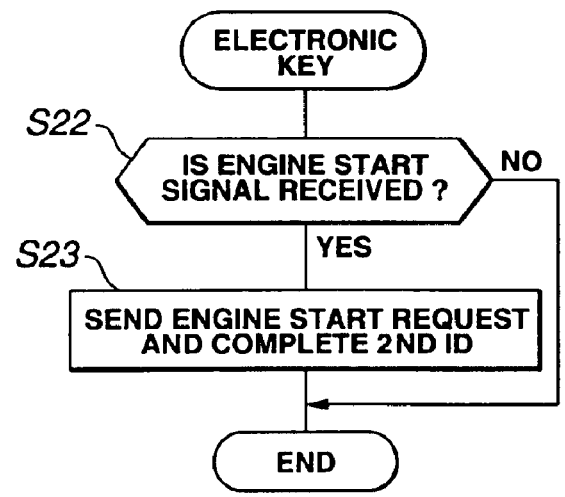
FIG. 9B is a flowchart showing another part of the engine start process executed by the electronic key in connection with the on-vehicle apparatus.
Figure 10:
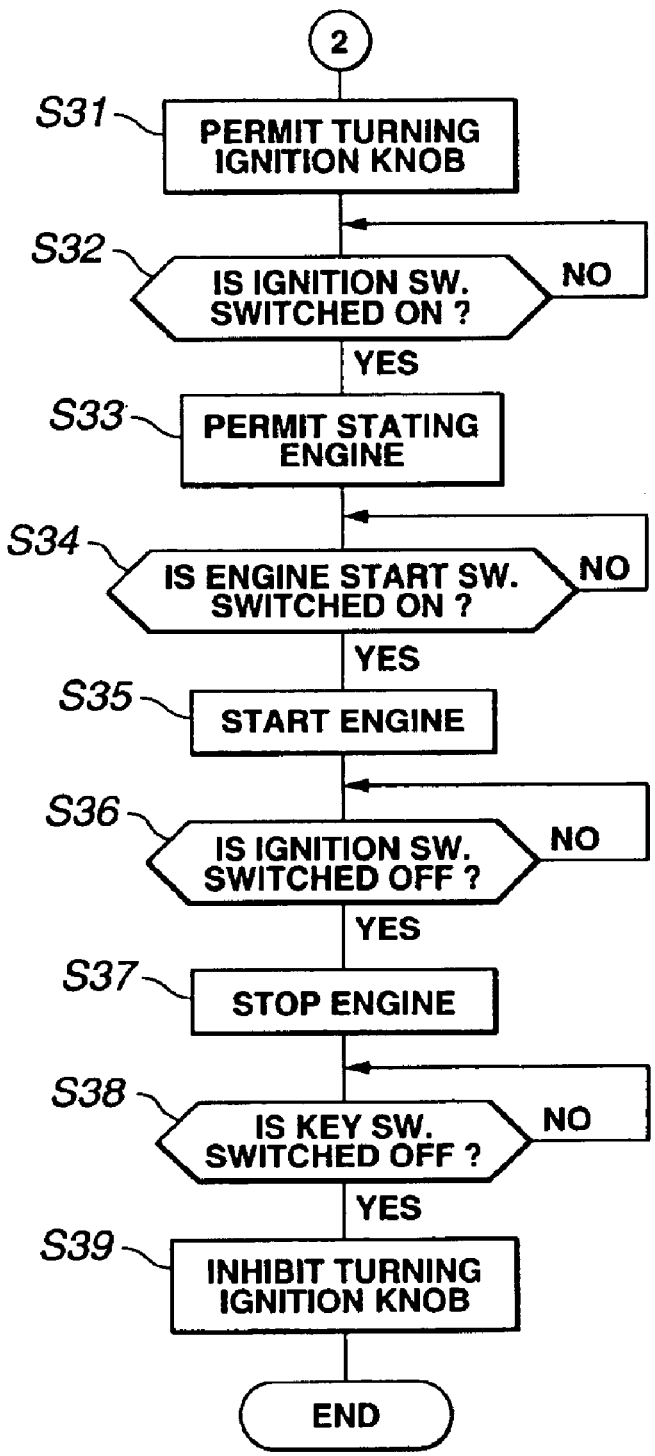
FIG. 10 is a flowchart showing another part of an engine start process executed by the on-vehicle apparatus.

As shown in FIG. 9B, electronic key 20 starts an operation shown in FIG. 9B in reply to the engine start process.

At step S22, electronic key 20 decides whether the engine start signal is received. When electronic key 20 receives the engine start signal from on-vehicle apparatus 1, the routine proceeds to step S23 wherein electronic key 20 outputs the engine start request and the complete second ID code to on-vehicle apparatus 1.

At step S24 following to the execution of step S21, on-vehicle apparatus 1 checks for a predetermined time period whether the engine start request signal and the complete second ID code are outputted by electronic key 20. When on-vehicle apparatus 1 receives the engine start request signal and the complete second ID code through antenna 12a and receiver 12, the routine executed by on-vehicle apparatus 1 proceeds to step S25. When on-vehicle apparatus 1 does not receive the engine start request signal and the complete second ID code for a predetermined time period, the routine executed by on-vehicle apparatus 1 proceeds to an end step to terminate the engine start process.

At step S25, on-vehicle apparatus 1 checks whether the complete second ID code received corresponds with the complete second ID code previously stored in memory 11b. When the received complete second ID code corresponds with the registered complete second ID code, the routine proceeds to step S31 discussed above. When the received complete second ID code does not correspond with the registered complete second ID code, the routine proceeds to the end step to terminate the engine start process.

Next, with reference to FIGS. 11A and 11b, the door lock process will be discussed. Herein, although the door lock process of driver door 40 is discussed, the door lock process of assistant door 43 is the same as the process of driver door 40. Therefore, the explanation of the door unlock process of assistant door 43 is omitted herein.

At step S41, on-vehicle apparatus 1 decides whether door lock switch 9a of driver door 40 is switched on according to the driver's operation for pushing door lock switch 9a. When door lock switch 9a is switched on, the routine proceeds to step S42. When door lock switch 9a is not switched on, the routine repeats the step S41 until the affirmative decision is made at step S41.

At step S42, on-vehicle apparatus 1 sends the door lock signal to electronic key 20 through second transmitter 3 and antenna 3a in driver door 40.

As shown in FIG. 11B, electronic key 20 starts awaiting the door lock signal outputted from on-vehicle apparatus 1, in reply to the start of this door lock process.

At step S43, electronic key 20 decides whether the door lock signal is received. When electronic key 20 receives the door lock signal from on-vehicle apparatus 1, the routine proceeds to step S44 wherein electronic key 20 outputs the door lock request signal and the complete first ID code to on-vehicle apparatus 1.

At step S45, on-vehicle apparatus 1 checks for a predetermined time period whether receiver 12 has received the door lock request signal and the complete first ID code from electronic key 20 through antenna 12a. When the door lock request signal and the complete first ID code signal are received, the routine proceeds to step S46. When receiver 12 does not receive the door lock request and the complete first ID code within the predetermined time period, the routine proceeds to step S48 wherein on-vehicle apparatus 1 generates alarm and inhibits the locking of doors 40 and 43.

At step S46, on-vehicle apparatus 1 checks whether the complete first ID code sent from electronic key 20 corresponds with the registered complete first ID code. When the complete first ID code sent from electronic key 20 corresponds with the registered complete first ID code stored in memory 11b, the routine proceeds to step S47. When the complete first ID code does not correspond with the registered complete ID code, the routine proceeds to step S48.

At step S47, on-vehicle apparatus 1 executes the locking of both doors 40 and 43 by controlling unlock and lock controller 13, and stores the correspondence of the first ID code in memory 11b.

When on-vehicle apparatus 1 receives the door lock request and the complete first ID code from electronic key 20 and when the received complete first ID code corresponds with the registered ID code, passive control unit 11 controls unlock and lock controller 13 to lock doors 40 and 43 by operating door lock actuator 14, and deletes the data indicative of the correspondence of the first ID code from memory 11b.

On the other hand, when on-vehicle apparatus 1 does not receive the door lock request and the complete first ID code from electronic key 20 or when the received complete first ID code does not correspond with the registered ID code, when the routine executed by on-vehicle apparatus 1 proceeds to step S48 where on-vehicle apparatus 1 does not executes the locking operations of doors 40 an d43 and generates alarm for a predetermined time period. Thereafter, the routine proceeds to an end step to terminate this door lock routine.

While the above embodiment according to the present invention has been shown and described such that memory 11b of passive control unit 11 has previously stored the first ID code for door unlock process and the second ID code for engine start process, the first ID code for door unlock process may be stored in memory 13b of unlock and lock controller 13 and the second ID code for engine start process may be stored in memory 15b of engine controller 15.

The entire contents of Japanese Patent Application No. 2000-100972 filed on Apr. 3, 2000in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. An electronic key system for a vehicle comprising:
an electronic key having first ID (identification data), second ID, and third ID which is shorter in data length than the second ID, said electronic key outputting the first ID, the second ID, and the third ID; and
an on-vehicle apparatus communicating with said electronic key by means of wireless communication, said on-vehicle apparatus having fourth ID, fifth ID, and sixth ID which is shorter in data length than the fifth ID, said on-vehicle apparatus permitting starting an engine of the vehicle when one of first and second conditions is achieved, the first condition including a condition that the second ID outputted from said electronic key corresponds with the fifth ID, the second condition including a condition that the first ID outputted from said electronic key corresponds with the fourth ID and the third ID outputted from said electronic key corresponds with the sixth ID, said on-vehicle apparatus requesting said electronic key to output the third ID when the first ID corresponds with the fourth ID and when an operator carrying said electronic key executes an operation for starting the engine.

2. The electronic key system as claimed in claim 1, wherein said on-vehicle apparatus permits unlocking a vehicle door when the first ID corresponds with the fourth ID.

3. The electronic key system as claimed in claim 1, wherein said on-vehicle apparatus requests said electronic key to output the first ID when an operator carrying said electronic key executes an operation for opening a vehicle door from an outside of the vehicle.

4. The electronic key system as claimed in claim 3, wherein said electronic key outputs the first ID only when said on-vehicle apparatus requests said electronic key to output ID for opening the vehicular door.

5. The electronic key system as claimed in claim 1, wherein said on-vehicle apparatus requests said electronic key to output the first ID when an operator carrying said electronic key approaches the vehicle to open the vehicular door.

6. The electronic key system as claimed in claim 1, wherein said on-vehicle apparatus requests said electronic key to output the second ID when an operator carrying said electronic key executes an operation for starting the engine.

7. The electronic key system as claimed in claim 6, wherein said electronic key outputs the second ID only when said on-vehicle apparatus requests said electronic key to output ID for starting the engine.

8. The electronic key system as claimed in claim 1, said electronic key outputs the third ID only when said on-vehicle apparatus requests said electronic key to output the third ID.

9. The electronic key system as claimed in claim 1, wherein the vehicular door has a key cylinder and is unlocked by inserting a key into the key cylinder and by turning the key, said on-vehicle apparatus permitting starting the engine when the vehicle door is unlocked by turning the key inserted in the key cylinder and when the second ID outputted from said electronic key corresponds with the fifth ID.

10. The electronic key system as claimed in claim 1, wherein said on-vehicle apparatus comprises an antenna through which said on-vehicle apparatus communicates with said electronic key located within a predetermined area outside of the vehicle.

11. The electronic key system as claimed in claim 1, wherein the third ID is a part of the second ID, and the sixth ID is a part of the fifth ID.

12. A method for permitting starting an engine of a vehicle, said method comprising:

checking whether first ID (identification data) outputted from an electronic key corresponds with first apparatus ID registered in an on-vehicle apparatus;

permitting unlocking a vehicular door when the first ID corresponds with the first apparatus ID;

requesting the electronic key to output second ID when the first ID does not correspond with the first apparatus ID;

checking whether the second ID corresponds with second apparatus ID registered in the on-vehicle apparatus;

permitting starting the engine of the vehicle when the second ID corresponds with the second apparatus ID;

requesting the electronic key to output third ID, which is shorter in data length than the second ID, when the first ID corresponds with the first apparatus ID;

checking whether the third ID corresponds with a third apparatus ID registered in the on-vehicle apparatus; and permitting starting the engine when the third ID corresponds with the apparatus third ID.

13. The method as claimed in claim 12, wherein said requesting the electronic key to output the second ID is executed when an operation for starting the engine is executed without checking the first ID.

14. An electronic key system for a vehicle comprising:

an electronic key having first ID (identification data) and second ID, said electronic key outputting the first ID, the second ID and a part of the second ID according to a request; and an on-vehicle apparatus communicating with said electronic key by means of wireless communication, said on-vehicle apparatus having third ID and fourth ID, said on-vehicle apparatus requesting the electronic key to output the second ID when the first ID does not correspond with the fourth ID, said on-vehicle apparatus permitting starting the engine of the vehicle when the second ID corresponds with the fourth ID, said on-vehicle apparatus requesting said electronic key to output the part of the second ID when the first ID outputted from said electronic key corresponds with the third ID, said on-vehicle apparatus permitting starting an engine of the vehicle when the part of the second ID outputted from said electronic key corresponds with a part of the fourth ID.

15. An electronic key system for a vehicle comprising:

an electronic key having first ID (identification data), second ID, and third ID which is shorter in data length that the second ID, said electronic key outputting the first ID, the second ID and the third ID; and an on-vehicle apparatus communicated with said electronic key by means of wireless communication, said on-vehicle apparatus having fourth ID and fifth ID, said on-vehicle apparatus deciding to start an engine of the vehicle when the second ID corresponds to the fifth ID, said on-vehicle apparatus deciding to start the engine of the vehicle when the first ID outputted from said electronic key corresponds with the fourth ID and when the third ID outputted from said electronic key corresponds with a part of the fifth ID.

* * * * *